US008220030B2

(12) United States Patent
Singhal (10) Patent No.: US 8,220,030 B2
(45) Date of Patent: Jul. 10, 2012

(54) SYSTEM AND METHOD FOR SECURITY IN GLOBAL COMPUTER TRANSACTIONS THAT ENABLE REVERSE-AUTHENTICATION OF A SERVER BY A CLIENT

(76) Inventor: Tara Chand Singhal, Torrance, CA (US)

( * ) Notice: Subject to any disclaimer, the term of this patent is extended or adjusted under 35 U.S.C. 154(b) by 1294 days.

(21) Appl. No.: 11/474,630

(22) Filed: Jun. 25, 2006

(65) Prior Publication Data

US 2007/0006286 A1 Jan. 4, 2007

Related U.S. Application Data

(60) Provisional application No. 60/695,920, filed on Jul. 2, 2005.

(51) Int. Cl.
*G06F 17/30* (2006.01)
*H04L 9/32* (2006.01)
*G06Q 20/00* (2012.01)

(52) U.S. Cl. ............... 726/2; 713/170; 713/176; 705/64; 705/70

(58) Field of Classification Search .................... 726/2–4
See application file for complete search history.

(56) References Cited

U.S. PATENT DOCUMENTS

| 6,195,698 | B1 * | 2/2001 | Lillibridge et al. | 709/225 |
|---|---|---|---|---|
| 6,476,833 | B1 * | 11/2002 | Moshfeghi | 715/854 |
| 6,993,658 | B1 * | 1/2006 | Engberg et al. | 713/185 |
| 7,100,049 | B2 * | 8/2006 | Gasparini et al. | 713/170 |
| 7,249,195 | B2 * | 7/2007 | Panec et al. | 709/238 |
| 7,269,852 | B2 * | 9/2007 | Uemura et al. | 726/26 |
| 7,346,775 | B2 * | 3/2008 | Gasparinl et al. | 713/170 |
| 7,360,092 | B1 * | 4/2008 | Peterson et al. | 713/175 |
| 7,562,222 | B2 * | 7/2009 | Gasparini et al. | 713/170 |
| 7,685,631 | B1 * | 3/2010 | Paya et al. | 726/8 |
| 2003/0012405 | A1 * | 1/2003 | Hatta et al. | 382/100 |
| 2006/0090073 | A1 * | 4/2006 | Steinberg et al. | 713/170 |
| 2006/0249567 | A1 * | 11/2006 | Byrne et al. | 235/379 |
| 2006/0259767 | A1 * | 11/2006 | Mansz et al. | 713/168 |
| 2006/0282662 | A1 * | 12/2006 | Whitcomb | 713/156 |
| 2007/0006286 | A1 * | 1/2007 | Singhal | 726/4 |

OTHER PUBLICATIONS

PCT Written Opinion of the International Searching Authority, International application No. PCT/US06/26111, dated Sep. 17, 2007.

* cited by examiner

*Primary Examiner* — Nasser Goodarzi
*Assistant Examiner* — Fatoumata Traore
(74) *Attorney, Agent, or Firm* — Steve Roeder Esq.

(57) ABSTRACT

A system of security for global computer transactions that provides a reverse-authentication authority system that enables a client to authenticate the server to the client first before the user of a client proceed to enter their user id and password or other personal data in the web page to assure them that the web page did indeed originate from the secure web server and not from an imposter. The system uses an authentication code that is given to the client user when they call a reverse-authentication server by an out-of-band method such as a telephone network, different than the global network and which then appears in the part of the web page for them to visually see and compare the one they have received in the telephone call to the server.

20 Claims, 6 Drawing Sheets

Figure 1

RAA code 60 Features 61

RAA code 60 is randomly generated and voice delivered to caller. Alternatively it may be made up and entered by the caller at the time of the call. 62

RAA code 60 may be any number of digits, preferred 4 to 8 digits and alphanumeric. May include well know icons symbols, such as heart. smiley-face, crescent etc. 64

RAA code 60 may be a graphic file with a background color or texture to display the code. 66

RAA code 60 may be placed on any corner of the web page, right top corner is preferred. 68

RAA code 60 may be displayed as a link, which when clicked links to RAAS to open a window showing the RAA code 60. 70

RAA code 60 may be a graphic file in index file, which the browser automatically fetches the image from RAAS server to display as part of the web page. 72

RAAS Database 24
Reverse authentication authority codes

| Date Stamp 24A | Caller Id 24B | RAA Code 24C | Client Return IP address 24D | RAA code image format 24F | Code Image address 24G | Time Stamp 24H |
|---|---|---|---|---|---|---|
| 01:04:2006 | 310 797 1234 | AJ2401 | 24.33.49.127:142 | AJ2401 | dir/mage/123.gif | 12:15:14 |

24E

RAAS Database 26
Secure Server Access code

| Name 26A | Secure Server URL 26B | Date 26C | Access code 26D |
|---|---|---|---|
| Bank-One | bankonline.com | 12:12:2005 | A9KD568904FDG |

RAAS Database 28
Log of secure server 30's request for RAA code 60

| Date 28A | Time 28B | Secure Server URL 28C |
|---|---|---|
| 04.07.2005 | 12:15:20 | www.bankonline.com |

Figure 6

SYSTEM AND METHOD FOR SECURITY IN GLOBAL COMPUTER TRANSACTIONS THAT ENABLE REVERSE-AUTHENTICATION OF A SERVER BY A CLIENT

CROSS REFERENCE TO RELATED APPLICATIONS

This application claims priority on U.S. Provisional Application Ser. No. 60/695,920, titled "Method And Apparatus For Reverse Authentication Of A Web Server To A Client" filed on Jul. 2, 2005, by Tara Chand Singhal. The contents of the Provisional Application Ser. No. 60/695,920 are incorporated herein by reference.

FIELD OF THE INVENTION

The present invention is directed to a system and method for reverse authenticating a secure web server to a client first before a client user enters a password or other account data to authenticate him/herself to prevent theft of such data by different forms of hacker attacks.

BACKGROUND

Information Technology enables many new and creative ways that are used and maybe used to spoof a secure web page from a bank server and that each and every part of a web page can be faked. Many hacker techniques can impersonate a web page as coming from the secure server. For example they can impersonate a web page to look exactly like a bank's real web page in all respects by copying the images and design layout of the bank's web page including impersonating the name of the web server that is displayed on the address section in the web page.

The customer then, has no clue if the web page in which they are about to enter their personal online banking identity data indeed did originate from the bank server. For this security issue, the industry has coined the term 'phishing", like to imply fishing for and stealing online bank identity. The industry has seen that the phishing scams are ever growing and ever so sophisticated by being automated that they had to form an anti-phishing organization to measure the extent of the problem.

Given the nature of today's threats, one cannot really be sure that the secure page with a lock at the bottom did come from the secure server of bank and the data being entered is going to the bank server and not to hackers. A person has no frame of reference to verify the web page authentication other than the address block in the browser, which address may be faked.

In light of the above, it is an objective of the present invention to have a system and method that enables a user to authenticate a secure web server before supplying his/her personal information to the secure server via the web page.

SUMMARY

This invention discloses a system and method of security in global computer network transactions that provide an out-of-band means, such as a telephone network, different than the global computer network, that enable a customer to obtain a code and a reverse-authentication mechanism that presents the code to the customer when the customer connects to a secure server on the network, thereby authenticating the server to the customer first before authenticating the customer to the server, thus assuring the customer the connection from the server is genuine and not spoofed. This invention is called Reverse Authentication Authority System (RAAS).

RAAS enables a bank's customer to authenticate a bank's secure web page first before proceeding to authenticate him/her self on the page via entering user id and password. RAAS thus provides a means by which the user can reverse authenticate a bank server before proceeding to authenticate him/her self so that the customer data is not stolen by hackers by the hackers impersonating a secure bank server login web page.

In RAAS, the customer obtains a Reverse Authentication Authority (RAA) code by an out-of-band method such as telephone network by calling the RAAS system on his cell phone. When the user connects to a secure web server such as that of an online bank, the same code is presented to him/her embedded in the login page as a means to assure the customer that the page originated form the secure web server and has not been spoofed.

The RAAS process is mostly transparent to the customer, until the web page with a RAA code image appears to verify the authenticity of the bank server. The RAAS uses and relies on existing information technologies. The RAAS system process is summarized in the following three steps A, B and C.

In step A, the customer may make a bank secure server connection from any personal computer (PC), a personal one or one in the library. A RAAS agent in the PC is automatically activated and opens a window to receive from the customer a caller id-secret number sequence and connects to the RAAS system. The RAAS system matches the information, saves the PC's Internet Protocol (IP) return address, creates a time stamp (TS), and responds with OK advisory to the RAAS agent in the PC. RAAS agent then exits and let the PC's secure server connection proceed as usual.

In step, B, the bank server's RAAS application, on receiving a connection request from customer PC, forms a query to the RAAS system with its own server authentication data and the customer's IP return route address. The RAAS system authenticates the bank server and then reverse matches the customer IP route address to find caller id record. If the caller id record that corresponds to the IP route address is found, the RAAS system creates an one-time/limited time use RAA code image file address and sends that image link address to the bank server.

In step C, the bank server embeds the image link in the login web page and sends it to the PC of the customer in response to the secure server connection request. The PC's browser fetches the image from the RAAS system and displays it to the user as a part of the login web page. The RAAS system times out on one image fetch or on a time stamp threshold expiry compared with the time stamp TS and deletes the image. The browser deletes the login page after login is performed. Hence, the RAA code image is stored in RAAS system for a few seconds.

The RAAS system serves the businesses by eliminating the risk of having their customers deceived and the bank funds stolen and serves the customers by assuring them that hackers are not picking up their private information.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts. The drawings are.

DESCRIPTION

Introduction

This invention discloses a system of security in global computer network transactions that provides an out-of-band method means, such as a telephone network, different than the global computer network, that enable the customer to obtain a code and a reverse-authentication mechanism that presents the code to the customer when customer connects to a secure server on the network, thereby authenticating the server to the customer and assuring the customer the connection from the server is genuine and not spoofed.

Information system security engineers sometimes use the security principle of out-of-band to transmit some parts of communication related to authentication via a channel or mode of communication that is different than the channel or mode of communication used for the transmission or communication of data or information. For example, if the Internet is one mode or means of communication, a telephone network works as a different or out-of-band mode or means of communication as they use different systems and protocols.

Figure 1:
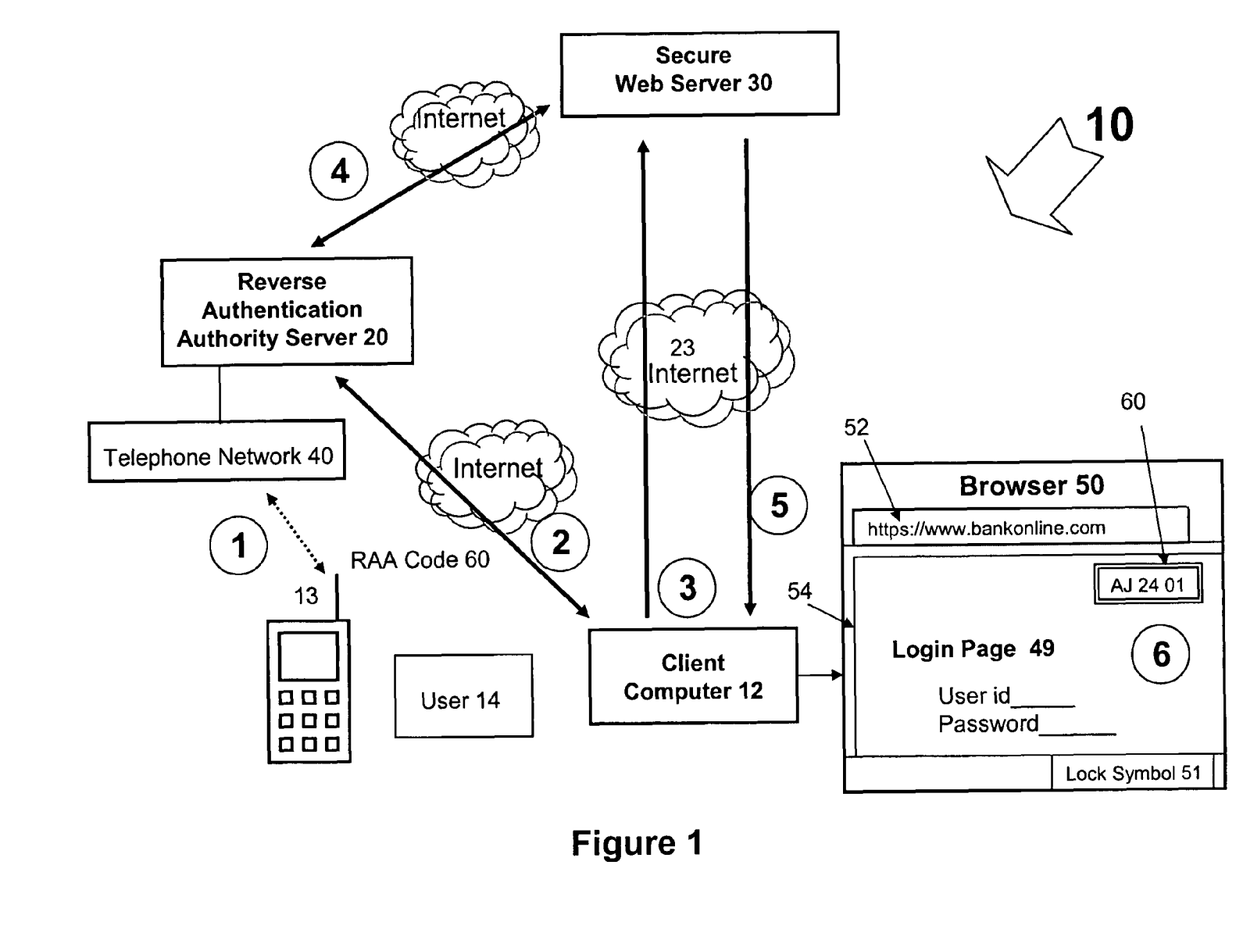
FIG. 1 is a block diagram that illustrates a version of the current invention of a reverse-authentication authority system.

With reference to FIG. 1, this invention discloses a reverse-authentication authority system (RAAS) 10 that includes a reverse-authentication authority server 20, that enables a client 12 when connecting to a secure web server 30 via Internet 23, to be able to authenticate that the web page 54 in browser 50 they are looking at, purporting to have come from address 52, with a lock symbol 51, did indeed come from the secure web server 30 and not from an imposter or hacker, by use of a reverse-authentication authority code 60 that is displayed on a part such as right top corner of web page 54.

The RAAS 10 serves to authenticate the server 30 to the client 12 before they proceed to enter their login information 49 in the form of user id and password or other personal data in the web page 54 to assure them that the web page 54 did indeed originate from the secure web server 30. The user 14 who has control of the client 12 has a phone 13, with which they call RAAS server 20 via telephone network 40 and receive a reverse authentication authority code 60, which is then shown on the web page as RAA code 60.

FIG. 1 also illustrates the six steps, identified by numerals enclosed in circles that are used in RAAS 10 and are described here:

In Step 1, the user 14, which controls the client 12 and has a phone 13, calls the RAAS server 20, without having a prior account or association with the RAAS 10. RAAS server 20 records date-stamp and caller id of the call and creates a random alphanumeric code, called reverse-authentication authority RAA code 60.

The RAAS server 20 saves the date-stamp, caller id and the RAA code 60 with caller id as a reference in a record in a database and voice delivers the RAA code 60 to user 14 via phone 13 in the same call.

Once the RAA code 60 is thus obtained, step 2 may be done any time thereafter whenever the user need to connect to the a bank secure server, since the RAA code 60 once obtained is good for a period of time and may work for multiple bank secure servers.

In Step 2, user 14 using client 12 then makes a connection to a secure server 30 using prior art https://SSL protocol. As a part of this invention, Client 12 Operating System (OS) is adapted as described later with reference to FIG. 3. This adaptation automatically first connects the client 12 to RAAS server 20, having pre-stored IP address to RAAS server 20 and embeds the caller id, in the connection to RAAS server 20. The caller id has been entered into client 12 as has been described with reference to FIG. 3, later.

RAAS server 20 receives the connection/query from client 12. Then RAAS server 20 matches the two caller ids, one from the call in step 1, and one from the connection from the client 12. If the two caller ids match, then using the caller id as a reference, RAAS server 20 saves client's return IP address and a timestamp TS in the same record as created in step 1.

RAAS server 20 then responds with OK message to client 12. The time stamp TS of the connection from the client 12 may be compared with the Date stamp of the call in step 1, to decide if the RAA code 60 is stale. For example, if the connection is made more than 30 days past the call's Date-stamp, instead of OK message, a message of RAA code expired may be sent to the client 12. If the two caller ids do not match, a message of NOK may be sent to the client 12.

Figure 3:
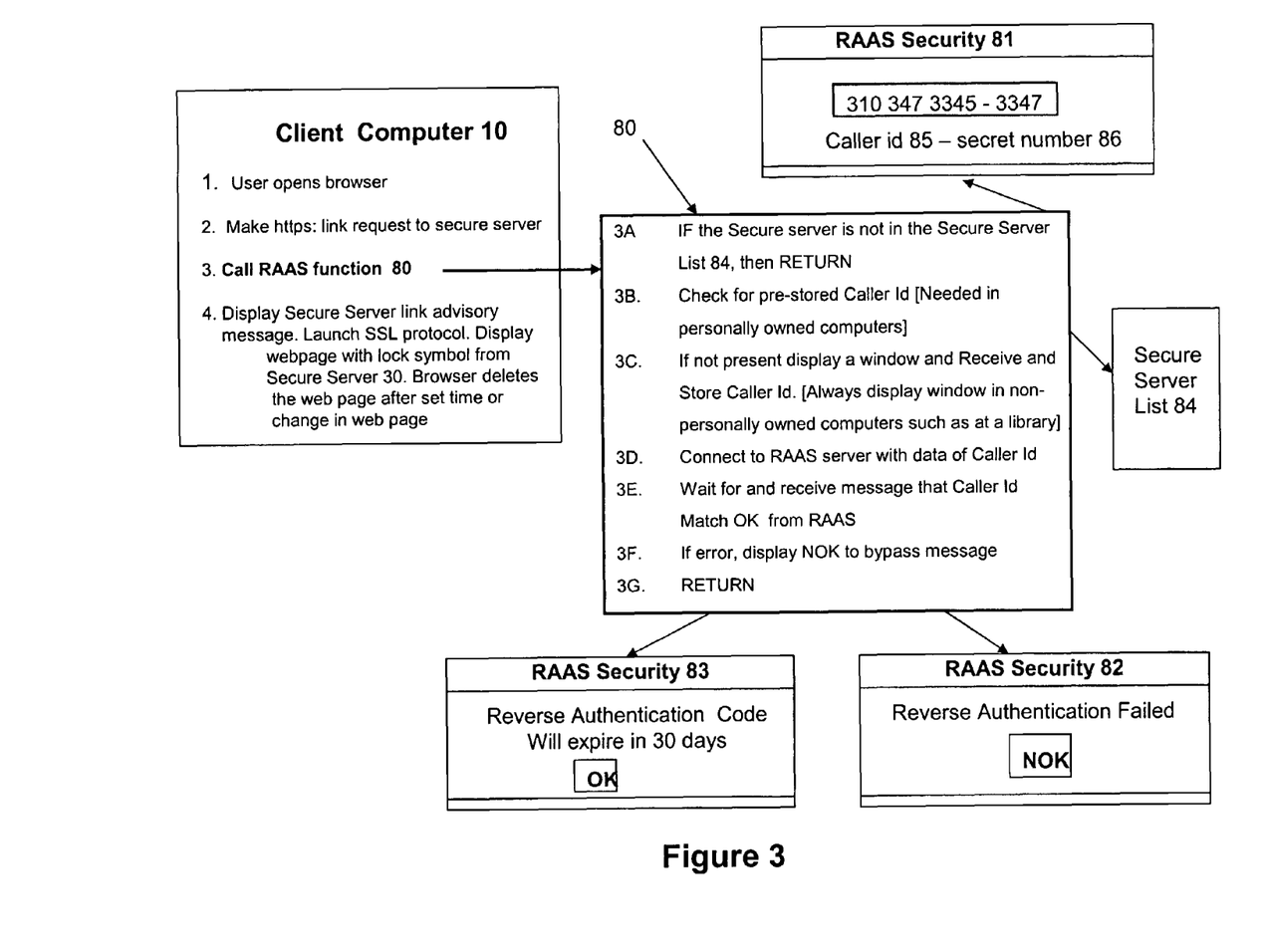
FIG. 3 is an adaptation of the prior art client operating system browser for a version of the current invention of a reverse-authentication authority system.

These messages are displayed to user 14 via the client 12, as described later with reference to FIG. 3. On receiving NOK message, an advisory message that RAA failed is displayed in the client 12, before proceeding to establish prior art SSL connection.

The caller id received by RAAS server 20 in step 1 and in step 2 acts as the linking mechanism where the RAAS server 20 identifies that the client 12 and the user 14 who made the call to RAAS server 20 on his/her telephone number are the same entity.

Alternatively, another number that is made up by the caller may be used for this linkage. However, use of caller id is preferred. The call can be made from any phone, however, a cell phone is preferred, as it provides a unique number for this linkage, without the caller having to create and enter a linkage number.

RAAS server 20 may be able to reliably identify a unique caller id, when the call has originated via cell telephone network, where the cell carrier provides the caller id and not the cell phone in the control and possession of the user. In some cases, the RAAS server 20 may not be able to reliably identify the caller id as the caller id may be made up by the user, such as in the calls originating from Private Box Exchange (PBX), where the PBX owner has the ability to make up the caller id and thus is able to impersonate another caller id.

To take care of such situations, a secret number may be used. The user may deposit the secret number in the RAAS server 20 via keypad entry on the phone at the time user receives the RAA code 60. Then in step 2, a caller id-secret number sequence may be entered and this may be used to provide the linkage in the RAAS server 20 between the user 14 in step 1 and the client 12 in step 2.

In Step 3, on receiving OK from RAAS server 20, Client 12 OS automatically launches prior art SSL protocol to connect to secure web server 30.

If OK is not received, as the linkage between the user 14 and client 12 could not be confirmed, the user is so advised and the SSL connection to the secure web server may proceed as it normally does, with the knowledge to the user that the RAA code in the web page would not be available. Hence the use of RAA code may not be necessary in all situations, and may be optional for the user, if so desired without affecting any of the prior art secure server connection operations.

In Step 4, secure web server 30, after completion of SSL protocol and before the initial web page 54 is sent to client 12, (as described in detail later with reference to FIG. 4) sends the client return link IP address to RAAS server 20 along with a special access code 26B of the secure web server 30 that is used to validate the secure server 30 to the RAAS server 20. The special access code 26B is described later with reference to FIG. 6 in database 26. Additional references to databases and database fields are used herein with reference to FIG. 6.

Figure 6:
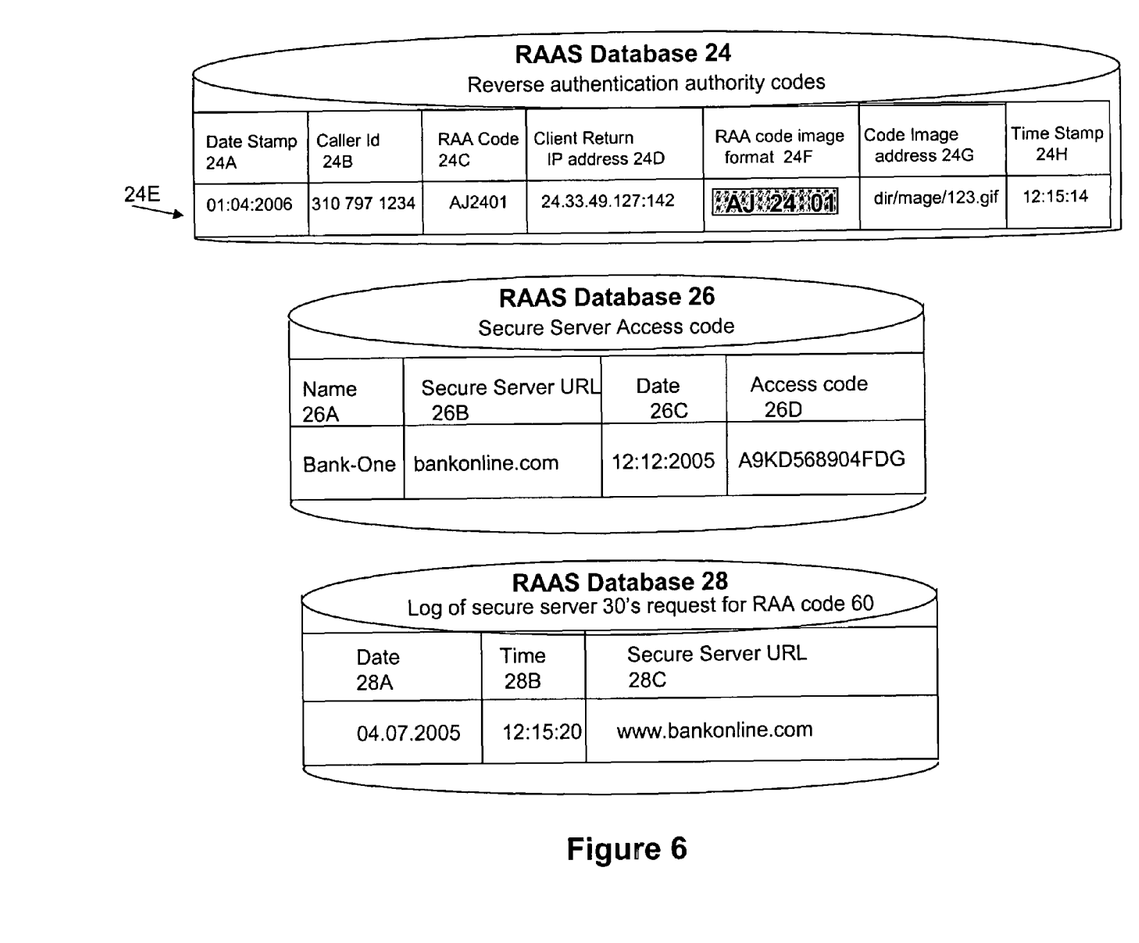
FIG. 6 is a block diagram that illustrates the database of the reverse-authentication authority system of the current invention.

RAAS server 20 first verifies the server access code 26D with pre-stored server access code 26D in database 26.

The RAAS server 20 uses the client 12's return IP address to link the connection/query from secure server 30 and the record that was created by the call in step 1 and the connection from the client in step 2. RAAS server 20 finds and matches the client link IP address with the client link address 24D that is stored in database 24. Then the RAAS server 20 finds and sends to the secure web server 30 the corresponding RAA code 60 shown as field 24C in the database 24 in the RAAS server 20.

Alternatively, instead of sending the RAA code, RAAS server 20 may send the code image link 24F in the database 24, to the secure server 30. The RAAS server 20 may convert the RAA code to an image file, having a unique image file name. When such an image file exists, the RAAS server 20 may send, not the RAA code itself or even the image file itself, but the link address of the image file to the secure server 30. This provides an additional level of security as the RAA code is not provided to the secure server 30, but the image needs to be fetched by the client 12 directly from the RAAS server 20.

In Step 5, secure web server 30 embeds the RAA code 24C in the login webpage. Alternatively the secure web server embeds the code image link 24F in the login web page. The login web page is then sent to the connection request from client 12.

In Step 6, client 12's operating system (OS) receives the login web page from secure server 30 and displays as web page 54 on the client screen. User 14 sees the RAA code 60 in the web page 54 and compares with the RAA code 60 that was voice heard earlier in the call in step 1. If the two RAA codes are the same, user 14 via client 12 is then assured that the web page 54 came from a secure server of bankonline.com 52 and not an imposter.

User 14 then can proceed to supply user id and password to login 49 or other personal data. The Client 12 OS deletes code image on the web page after a set time or on browser page change.

A time stamp feature may additionally be used for additional security. In Step 2, a time stamp TS may be created, recording the time when the client 12 made the connection to the RAAS server 20. Before making the secure server 30 connection, TS being recorded in the RAAS database. When in step 6, if the RAA code is in the form of an image link address, where the RAA code image needs to be fetched from the RAAS server 20, by the browser 50, the RAAS server 20 verifies that the time of this image fetch is within a pre-set delta time threshold of time stamp TS.

The call to RAAS server 20 by user 14, using his/her phone 13, to receive a reverse-authentication RAA code 60 may be made as less often or as more often as desired by the user 14. Further, they may be made using any phone provided the caller id of the phone and that provided to the client, as described with reference to FIG. 3, in RAAS Security window 81 are the same. It is preferred they are made using his/her cell phone as that provides a unique caller id number.

If a user 14 makes a subsequent call, on this subsequent call, the prior RAA code is replaced by a new RAA code in the RAAS server 20's database 24. For example, a user 14 may call the RAAS server 20 whenever he/she likes and see that specific reverse-authentication authority code 60 in all web pages from secure server connections after that call, provided the secure web server 30 has established an account with the RAAS 10 service.

The user may refresh and receive a new authentication code 60 every month, or every week or any time he/she needs to refresh it, or even every year. The RAAS system 10 may implement a policy that these codes expire or become stale after a fixed period of time such as a month or a year. If the code expires, the status of code is displayed to the user 14, as described later with reference to FIG. 3.

There is no prior account needed or established at RAAS server 20 for a user for such calls. The cost of the service may be borne entirely by the bank companies that have secure server 30 and create an account with the RAAS 10. In addition or alternatively, the phone companies for each call made to the RAAS server 20 for RAA code 60 may collect fees from those who own the phone.

Reverse-Authentication Authority Code (RAA Code 60)

Figure 2:
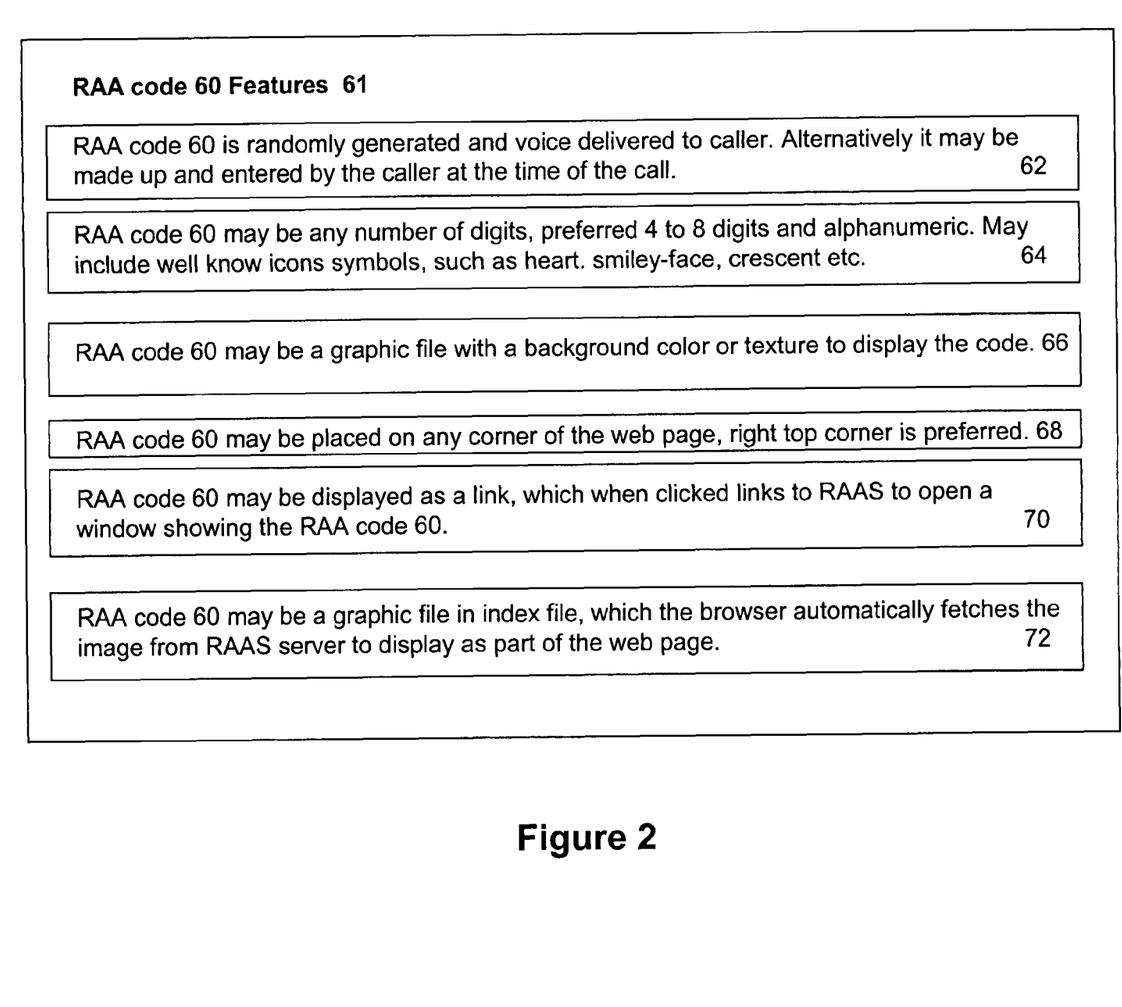
FIG. 2 is a block diagram that illustrates features of reverse-authentication authority codes.

The RAA code 60 can take the form of a simple alphanumeric such as KAP457 or phrase such as "Clear Ocean" or even symbols, for example, smiley face, crescent, heart and others. Furthermore a user may have the option to choose the format of the RAA code that he/she may desire.

The RAA code 60 may be created anytime from anywhere by the user by calling a private-number via a phone that has a caller id associated with it, to the RAAS server 20.

The RAAS server 20 may generate the RAA code randomly. Alternatively, the RAAS code may be created by the customer and merely deposited in the RAAS system by the customer.

Once the RAA code is obtained, it can be good for any length of time such as up to one year. However, it can be regenerated to a new replacement code whenever the user desires. The RAA code is anchored in the RAAS system by the caller id of the phone. The caller id is simply used as a reference. It does not matter which caller id it is and no account need be established.

When the user connects to a secure server, the RAA code 60 appears as a graphic file in the corner of the login page to assure the customer that indeed this login page is not as a result of phishing or spoofing.

As illustrated with reference to FIG. 2, RAA code 60 may have many features. These features 61 of RAA code 60 are described below.

As a first feature 62, the RAA code 60 may be randomly generated and voice delivered to user. Alternatively, the code may be made up and entered by the user at the time of call.

As a second feature 64, the RAA code 60 may be any number of digits, preferably 4 to 8 digits alphanumeric, and may include well-know symbols, like heart, smiley-face, crescent etc., which are easy to remember or visually identify by the user 14.

As a third feature 66, the RAA code 60 may be a graphic file that includes color and texture as part of a code, with a background color or texture to display the code.

As a fourth feature 68, the RAA code 60 may be placed on any corner of the web page 54, but right top corner position may be a preferred position.

As a fifth feature 70, the RAA code 60 may be displayed as a link, which when clicked links to RAAS server 20 to open a window showing the code. The RAA code 60 may be displayed as a separate overlaid window over the web page.

As a sixth feature 72, the RAA code 60 may be displayed as a numeric. Alternatively the code may be a graphic file in index file that made up the web page, which the browser automatically fetches the image from RAAS server 20 to display as part of the web page itself.

There may be other ways that may be used to communicate the reverse-authentication code to the user and or client, and are not ruled out. For example, short messaging system (SMS) may be used to deliver the code to the cell phone of the caller.

Client Computer 12

The prior art client computer 12 operating system (OS) is adapted to perform RAAS functions. This adaptation may be slightly different for a personally owned computer and a computer for common public use such as in a library. These are described with reference to FIG. 3. With reference to FIG. 3, the Operating system and or the browser performs the following steps or functions:
1. User opens browser.
2. User makes secure server https: link request to a secure server
3. The OS/Browser is adapted, according to this invention to call RAAS function 80. The RAAS function 80 performs the following steps:
   3A. IF the Secure server is not in the Secure Server List 84, then RETURN
   3B. Check for pre-stored Caller Id. This function is needed in personally owned computers and not in computers such as at a library.
   3C. If the stored Caller Id is not present, then display a RAAS Security window 81 that enables the user to enter a caller id 85 and secret number 86, which are then received by the function 80.
   3D. Connect to RAAS server with data of Caller Id 85 and secret number 86.
   3E. Wait for and receive response from RAAS server 20
   3F. RAAS server 20 response may be OK or NOK. If error, display NOK to bypass message in RAAS security window 82 to inform the user that the reverse-authentication failed since the caller id-secret number sequence of the call and the caller id-secret number entered herein did not match. Alternatively browser displays window 83, which shows OK and time to expire the code.
   3G. RETURN or resume prior art browser functions.
4. The browser resumes the prior art SSL protocol and displays secure server link advisory message. The browser then completes SSL protocol with the secure server. The browser then receives login web page from secure server 30 and display such a login web page with prior art lock symbol from secure server 30. The login web page also displays this invention's RAA Code 60 in a part of the login web page, the same code that was delivered to the caller by the server 20. The browser then deletes the login web page after a set time or change in web page, so that the RAA code 60 is not stored in the client computer 12.

This client 12 OS adaptation may include and maintain a list 84 that identifies those secure servers that have established an account with the RAAS 10. Hence when the client 12 connects to a secure server 30 from this list 84, the operation is as identified in this invention. If the secure server 30 is not in the list 84, the features of this invention may not be activated.

This helps to differentiate the many other secure server connections that are normally used by a user, which may not be for financial transactions that require the security provided by this invention. These secure server connections may be carried out normally without activating the security features of this invention.

The RAAS 10 may also be used for non-financial transaction applications where serious harm may be caused when the web page(s) from a secure server may be spoofed.

Secure Web Server 30

Figure 4:
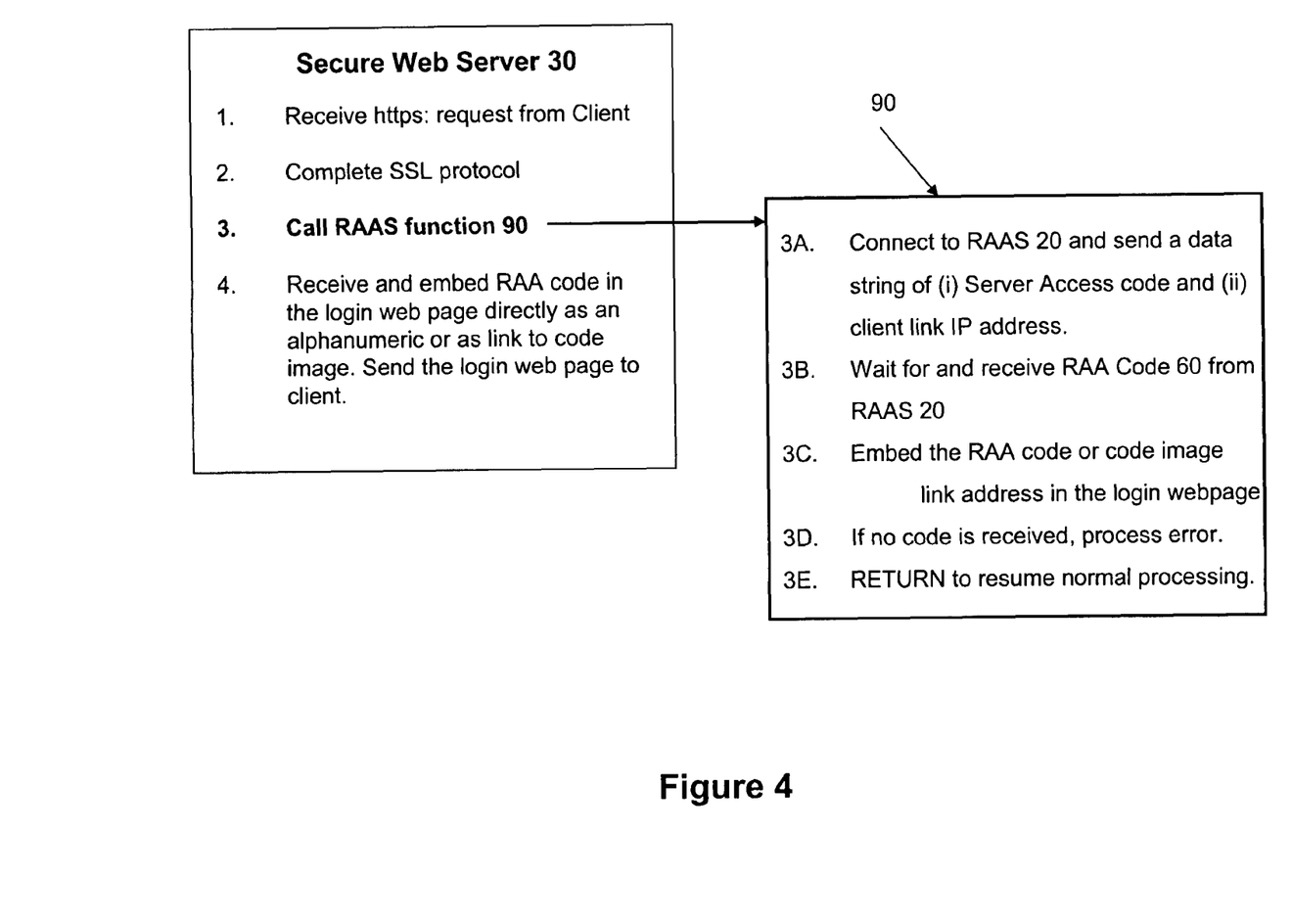
FIG. 4 is an adaptation of prior art Secure Web server for a version of the current invention of a reverse-authentication authority system.

A prior art secure web server 30 is adapted to perform RAAS functions. These are described with reference to FIG. 4. With reference to FIG. 4, the secure server performs the following functions:
1. Receive https: request from client.
2. Complete SSL protocol.
3. The secure web server 30 is adapted, according to this invention to call RAAS function 90. The RAAS function 90 performs the following steps:
   3A. Connect to RAAS server 20 and send a data string of secure server identification, secure Server access code, and client return IP address.
   3B. Wait for and receive RAA Code or RAA code link address from RAAS server 20.
   3C. Embed the RAA code or code image link address in the login webpage
   3D. If no code is received, process error.
   3E. RETURN to resume normal processing.
4. Embed RAA code in the login web page as described earlier.

As described above, the secure server 30 adaptation embeds the RAA code in the login web page. However, based on security needs of different applications of this invention, the RAA code may be embedded in other web pages also.

Reverse-Authentication Authority Server 20

The RAAS server 20 may include a processor [not shown] that can include one or more conventional CPU's. The processor can be capable of high volume processing and database searches. The system storage device [not shown] can, for example, include one or more magnetic disk drives, magnetic tape drives, optical storage units, CD-ROM drives and/or flash memory. The storage memory may be any high-speed conventional memory such as Flash or similar other memory that can retain data without power. Alternatively, it may also be disk-based storage memory.

In general, the RAAS server 20 is a general-purpose digital computer that has been adapted to perform the functions of a reverse-authentication authority as described here.

Figure 5:
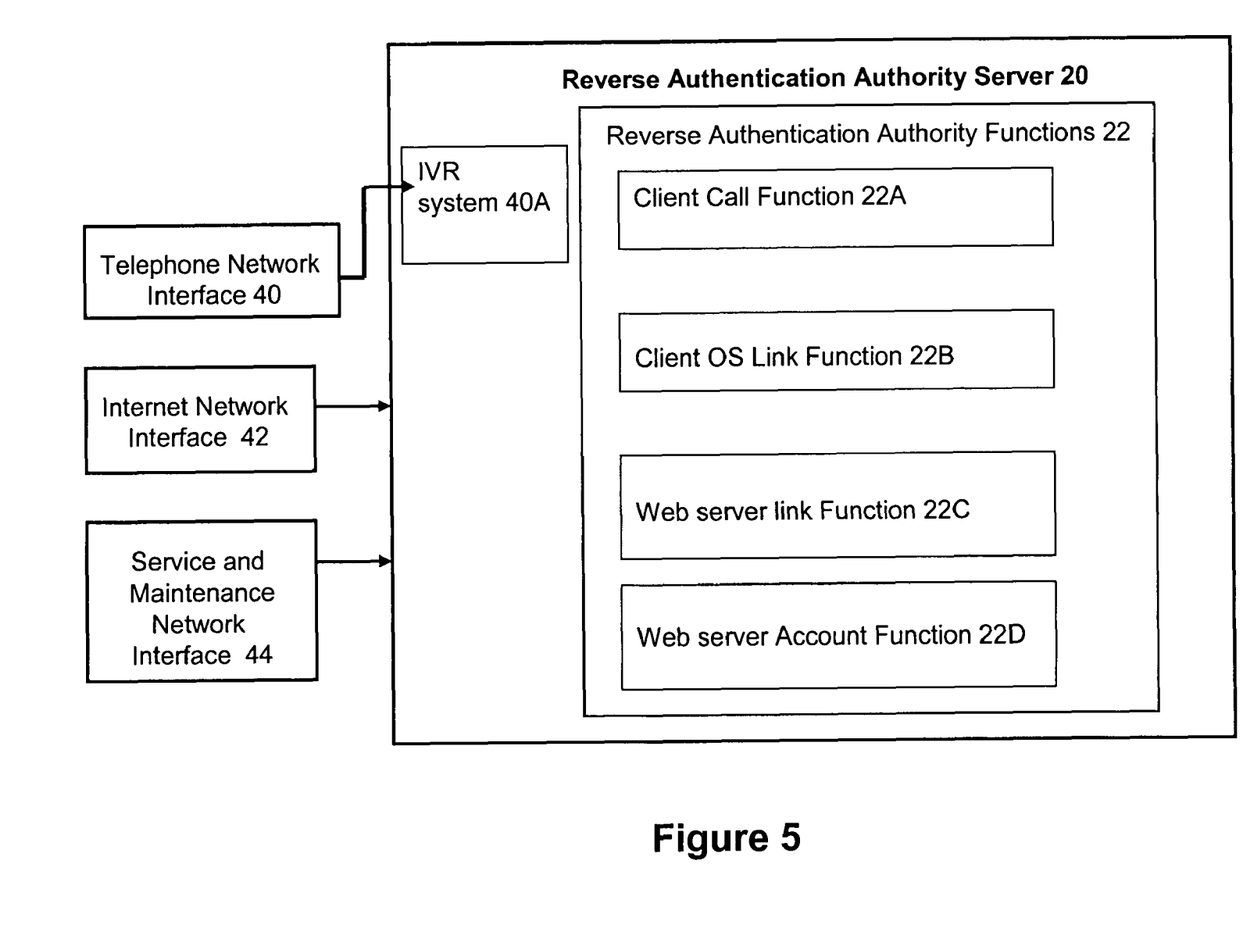
FIG. 5 is a block diagram that illustrates the functions of the reverse-authentication authority system of the current invention.

With reference to FIG. 5, the server 20 includes a telephone network interface 40 that allows the server to communicate with the user 14 via the phone 13. The server 20 also includes a system network interface 42 that allows the system 20 to communicate with the Internet 23 or another computer network. The server 20 also includes a system network interface 44 that allows access by a service and maintenance network.

The server 20 is adapted to include an Interactive Voice Response (IVR) function 40A that can receive a call from telephone network 40, get caller id, receive tone inputs, convert them into numbers, and output a voice response to the user. The IVR technology is prior art and already used by many businesses.

The service interface 44 is able to load data such as storage memory as in databases 24, 26 and 28 into the authentication server 20. The service interface is also used to load programs such as authentication function and interface functions. The service interface may include another computer and is prior art.

The server 20 includes reverse-authentication authority functions 22 that are identified with reference to FIG. 5 and databases that are used for these functions and are identified with reference to FIG. 6.

Reverse-Authentication Authority Functions 22

With reference to FIG. 5 and FIG. 6, Reverse-authentication Authority Functions 22 in Reverse-authentication Authority Server 20, are described here:

Client Call Function 22A performs the following sub-functions:
- Receive call from phone 13, create record 24E to save caller id 24B and date stamp 24A of the call in database 24.
- Create RAA code 24C.
- Voice-deliver code 24C to phone 13 of user 14.
- Delete record 24E after a fixed period.

Client OS Link Function 22B performs the following sub-functions:
- Receive request from Client 12 OS
- Find Record 24E using Caller Id 24B in database 24
- Save client return IP address 24D in database 24.
- Create and save time stamp 24H of the time of the call.
- Send OK/NOK to client 12

Web server link Function 22C performs the following sub-functions:
- Receive request from secure web server 30
- Verify server access code 26D with database 26.
- Find record 24E in database 24 using client return IP address 24D.
- Create a code image address 24G to store code image for delivery from the RAAS server 20.
- Authenticate the fetch request of the code image by the client browser using the client return IP address.
- When the image is accessed from the RAAS server 20, it is deleted, after access, so that it cannot be accessed again, thus ensuring that the code image is available only once to the user 14 when he/she sees the secure server login page from the secure server 30.
- Send RAA code 24C to the secure server 30. Alternatively send the created code image address 24G to the secure server 30. There are different ways a reverse-authentication code may be delivered to by the RAAS server 20 to the secure server 30 to embed in a login web page for delivery to the client 12.
- Create a log record in database 28.

Web server Account function 22D performs the following sub-functions:
- Receive request from secure server 30 to open an account.
- Create a record in database 26, and assign and deliver a server access code 26D to secure server 30.
- Create a bill based on fee plus usage using database 28

Databases 24, 26 and 28

With reference to FIG. 6, the databases that are used in the RAAS server 20 are RAAS databases 24, 26, and 28.

RAAS database 24 contains reverse-authentication authority codes and maintains a record 24E. Each record 24E includes fields for a date stamp 24A, when the RAA code was generated and delivered to the user 14, caller id 24B, RAA code 24C, client return IP address 24D on the global network, the RAA code in image format 24F, code image address 24G in the RAAS server 20, and timestamp 24H when the client 12 connects to the RAAS server 20.

The code image address 24G is used to store the image itself for access from outside the server 20. When the image is accessed it is deleted after access so that it cannot be accessed again, thus ensuring that the code image is available once only to the user 14 when he/she sees the secure server login web page.

RAAS database 26 contains Secure Server access codes and has the fields of bank name 26A, online bank server URL 26B, Date 26C and an access code 26D, where the access code 26D is assigned to the secure server 30 at the time of account establishment and is subsequently used to verify a connection request from the secure server 30.

RAAS database 28 contains a log of secure server 30's request to RAAS server 20 for the RAA codes for the client 12, using fields such as date 28A, time 28B, and Web server URL 28C. Such log information is used to prepare service, billing and account statements.

The RAAS 10 implementation, as described herein is cost effective and logistically easy to implement. The user's PC requires a RAAS agent, which can be delivered by the bank or may become part of the browser or operating system. The user only need create or receives a RAA code from the RAAS server via a phone call with an associated caller id. The RAAS agent is only activated on connections to a list of secure servers such as those belonging to online banks and not for all secure server connections.

The bank's secure server requires a RAAS interface agent and an account with the RAAS system. The RAAS system may be an independent system and may be owned by a bank, independent company, or a consortium of banks. Very large institutions may choose to maintain their own RAAS servers.

Those who benefit from the RAAS system pay for it. A RAAS system is a fixed cost and handles a large number of customers. Scaling a RAAS server drives down the costs as more and more banks and their users are added. In addition, the user may be charged a fee for the RAA code by billing it to their phone account.

In summary, the RAAS 10 invention provides a mechanism by which a user when connecting to a bank's online web server on Internet for financial transactions can authenticate the server before providing his/her personal online identity information to the web server. The RAAS system of this invention thus serves the businesses by eliminating the risk of having an imposter steal data from their online identity data from their customers. Thus RAAS eliminate the risk of the bank's customers from being a target for hackers.

While the particular method and apparatus as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

What is claimed is:

1. In global computer transactions, a system of security comprising:
   a. a reverse-authentication authority system (RAAS) that authenticates a secure web-server to a user on a client before the user via the client authenticates by login to the secure server;
   b. the reverse-authentication authority system (RAAS) has a RAAS server on a global computer network, with a RAAS function and a RAAS database, the RAAS database stores a private reverse authentication authority (RAA) code of a user;

c. the RAAS server has a cellular telephone network interface, the interface with the help of the RAAS function identifies the user by a caller id, enables the user to create the RAAS code and associate the RAA code to the caller id in the RAAS database;

d. the RAAS facilitates authentication of a secure (https) web-server to the user first by the secure web-server delivering a webpage to a user client, with the webpage displaying the RAA code to the user, before the user authenticates to the secure web-server by submitting private login data.

2. The system of security claim as in 1, RAAS comprising:
the RAAS function that is able to receive a call on a cell phone associated with the caller id, generates the RAA code, saves the RAA code in the RAAS database and delivers the RAA code to the user.

3. The system of security as in claim 2, comprising:
the RAAS function generates the RAA code, in a random manner, in one of the format from a group of, an alphanumeric, a phrase, and symbols, at the option of the user; enables depositing of a secret number in the RAAS by the user at the time of receiving the RAA code; and enables regenerating the RAA code by the user at any variable period of time, alternatively a fixed period of time not to exceed a predefined limit.

4. The system of security claim as in 1, comprising:
the RAAS function has an interface with a RAAS agent in a client that identifies a specific client that is used by the user to connect to the secure server.

5. The system of security claim as in 4, comprising:
the RAAS function creates a time stamp of the time of the client to RAAS function connection and delivers the RAA code to the user client via the secure server within a defined time threshold of the time stamp as an additional security measure.

6. The system of security claim as in 1, comprising:
the RAAS function enables the RAA code to be displayed on a login web page received from the secure server when the user's client connects to the secure server, the RAAS function having verified the secure web server before enabling the secure server to present the RAA code to the client.

7. The system of security claim as in 1, comprising:
the RAAS function interfaces with a RAAS agent in the secure web server for an authentication function for authenticating interfaces to it from the secure server;
the RAAS function maintains an account function that accounts for connections to it from the secure server and billing usage fees for the business entities owning the secure server.

8. The system of security as in claim 1, further comprising:
a. the RAAS database stores the private reverse authentication authority (RAA) code of a user deposited therein by the user;
b. the user client connects to the secure server, the secure server connects to the RAAS server, authenticates itself to the RAAS, identifies the user to the RAAS by a client IP address and receives a RAA code specific to the user; and
c. the secure server embeds the RAA code in the secure web page before delivering the webpage to the user client, thus by displaying the RAA code to the user, the secure server authenticates itself to the user first before the user authenticates to the secure web-server by submitting private login data.

9. A system of security in global computer network transactions comprising:
a. a reverse authentication authority system (RAAS) server that authenticates a secure, https-web-server to a user when a user client communicates with the secure web server to establish a secure session of communication where the user authenticates the secure web-server by reverse authentication of the web server to the user by using the RAAS server;
b. the RAAS server has a cellular telephone network interface that identifies the user by a caller id, enables the user to create and deposit a RAA code in the RAAS server, and the RAAS server stores the RAA code associated with the caller id;
c. the secure web-server authenticates itself to the RAAS server first, then identifies the user to RAAS server to obtain the RAA code specific to the user and then embed the RAA code in the web page being delivered to the user client for display to the user by the client browser.

10. The system of security in global computer network transactions as in claim 9, comprising:
the secure web-server identifies the user by a user client IP address to the RASS server, where the user client has first connected to the RAAS server for the RAAS server to identify the user and capture user client IP address.

11. The system of security in global computer network transactions as in claim 9, comprising:
the RAA code is maintained as a image file in the RAAS server and the secure web-server is given the link to the image file in the RAAS server to embed in the secure webpage being delivered to the user client;
b. the RAA code image is fetched from the RAAS server by the client browser, for display as part of the page, thus avoiding transferring the code to the secure web-server as an added measure of security.

12. The system of security in global computer network transactions as in claim 9, comprising:
the RAAS server deletes, the image file link and the user client identifying IP address after expiry of time thresholds in the RAAS server.

13. The system as in claim 9, comprising:
the RAAS server generates the RAA code, maintains the code, and enables its delivery to the user.

14. The system as in claim 9, comprising:
the RAAS server authenticates the secure server before enabling the delivery of the RAA code to the secure server and then to the user by the secure server.

15. The system as in claim 14, the RAAS server comprising:
a RAAS function delivers an image file link of the RAA code to the secure server to be forwarded to the user client, wherein the image can only be fetched from the RAAS by the user client within a specified time threshold.

16. A method of security in global computer network transactions using a reverse authentication authority system (RAAS) server that facilitates authentication of a secure web server to a user comprising the steps of:
a. enabling setting up a private RAA code in the RAAS server, through a cellular telephone network call by a caller user, saving the RAA code in the RAAS server anchored by the caller id of the call;
b. enabling accessing a pre-identified secure (https://) web-server on a global computer network by the user via a user client, by first enabling connecting to the RAAS server, where the RAAS server captures the client IP address, and then immediately thereafter enabling connecting by the user client to the secure web-server;

c. connecting by the secure server to the RAAS server to first authenticate itself and then using the client IP address as a identifying reference, receiving the RAA code, specific to the user, from the RAAS server, embedding the RAA code in a secure webpage and sending the page to the client, thus enabling the user to view the RAA code to authenticate the secure web-server before submitting private data to the secure web-server.

17. The method as in claim 16, further comprising the steps of:

a. maintaining the RAA code in the RAAS server as an image and sending to the secure web-server by the RAAS server, only a link to the RAA code image file in the RAAS server, for embedding in the webpage delivered to the user client;

b. fetching by the client the RAA code image file from the RAAS server to display on the login webpage, thereby enabling the user to authenticate the secure web-server to the user and by providing added security of not transferring the RAA code to the secure web-server.

18. The method as in claim 16, further comprising the steps of:

deleting in the RAAS server, the image file link and the user client identifying IP address after expiry of time thresholds.

19. The method of security in global computer network transactions as in claim 16, comprising the steps of:

receiving a PIN from the call to the RAAS server, and using the caller id and the PIN to identify to the RAAS server for the server to know the client current IP address enabling the reverse authentication of the web server to the user from any client.

20. The method claim as in 16, further comprising the steps of:

a. generating, in a random manner by the RAAS server, the RAA code in one of the format from a group of, an alphanumeric, a phrase, and symbols, at the option of the user;

b. regenerating the RAA code by the user at any variable period of time, alternatively a fixed period of time not to exceed a predefined limit.

* * * * *